United States Patent Office 3,634,486
Patented Jan. 11, 1972

3,634,486
DINITRILES DERIVED FROM α,β-UNSATURATED NITRILES AND HYDROXY SUBSTITUTED FATTY NITRILES
John R. Nazy, Shoreview, and Robert C. Kuder, Excelsior, Minn., assignors to General Mills, Inc.
No Drawing. Filed Apr. 25, 1969, Ser. No. 819,476
Int. Cl. C07c *121/20*
U.S. Cl. 260—465.6                9 Claims

ABSTRACT OF THE DISCLOSURE

Dinitriles of the formula:

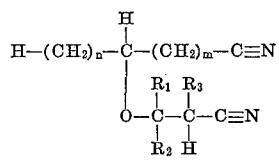

where $n$ is 5 to 20, $m$ is 0 to 15, the sum of $n$ and $m$ is 14 to 20 and $R_1$, $R_2$ and $R_3$ are hydrogen or short chain alkyl groups of 1 to 4 carbon atoms. Diamines and diisocyanates derived therefrom with the latter being useful for preparing polymers.

---

The present invention relates to new dinitriles. More particularly, it relates to such dinitriles ultimately prepared from certain fatty compounds and unsaturated nitriles.

The new dinitriles of the present invention have the structural formula:

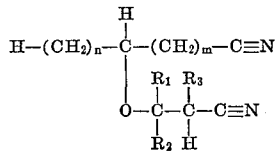

where $n$ is 5 to 20, $m$ is 0 to 15, the sum of $n$ and $m$ is 14 to 20, and $R_1$, $R_2$ and $R_3$ are hydrogen or short chain alkyl groups of 1 to 4 carbon atoms. $R_1$–$R_3$ are preferably H. It is especially preferred that the sum of the whole integers $n$ and $m$ is 16. Our new dinitriles are useful as intermediates (via the nitrile groups) in the preparation of diacids, diesters, diamines, and the like. The diamines, for example, are useful for preparing diisocyanates which in turn can be reacted with a variety of organic compounds containing two or more active hydrogens to yield polymers having utility as coatings, moldings and the like.

The dinitriles of our invention can be prepared by the reaction of an α,β-unsaturated nitrile with a hydroxy substituted fatty nitrile. Representative α,β-unsaturated nitriles are acrylonitrile, methacrylonitrile and crotonic nitrile with the first being the preferred reactant.

The starting hydroxy substituted fatty nitriles can be prepared in a number of ways. One procedure is that set forth in VanderWal Pat. 2,558,666 which shows the preparation of mixtures of such starting materials by the reaction of sulfuric acid under moderately low temperatures with unsaturated nitriles to form sulfates (sulfuric esters) which sulfates are then hydrolyzed to form the hydroxy substituted fatty nitriles.

The preparation of mono-nitriles from fatty acids and ammonia is well known. This preparation and the conditions useful in same are set forth in "Fatty Acids And Their Derivatives" by A. W. Ralston, 1948, pp. 620–625 (John Wiley & Sons, Inc.). The useful monoethylenically unsaturated aliphatic monobasic carboxylic acids which can be converted to the mono-nitriles and then to the starting hydroxy substituted mono-nitriles can be represented by the following: 9-hexadecenoic (palmitoloeic), 7-hexadecenoic, 2-hexadecenoic, 2-heptadecenoic, 2-octadecenoic, 3-octadecenoic, 4-octadecenoic, 5-octadecenoic, 6-octadecenoic (petroselinic), 7-octadecenoic, 8-octadecenoic, 9-octadecenoic (oleic, elaidic), 10-octadecenoic, 11-octadecenoic (vaccenic), 12-octadecenoic, 2-nonadecenoic, 9-eicosenoic (gadoleic), 11-eicosenoic, 13-docosenoic (erucic), 11-docosenoic (cetoleic) and the like.

The α,β-unsaturated nitrile is condensed with the described hydroxysubstituted fatty nitriles using an alkaline catalyst and moderate temperatures. A preferred catalyst is sodium ethoxide prepared by dissolving sodium in absolute ethanol. It is also preferred to use an excess of the unsaturated nitrile and temperatures of about 25 to 100° C. are preferred.

The following examples are illustrative of the invention without being limiting.

EXAMPLE I

A mixture (140 g., 0.5 mole) of approximately equal parts of 9- and 10-hydroxystearylnitrile was heated to 50° C. and 2.5 ml. of catalyst solution (made by dissolving 0.5 g. of sodium in 10 g. of absolute ethanol) was added. Then 26.5 g. (0.5 mole) of acrylonitrile were added and heating was continued for 3½ hours at 51–64° C. The reaction mixture was cooled to 50° C., another 2.5 ml. portion of catalyst solution was added, and then 26.5 g. more acrylonitrile were added over a five minute period (the temperature increased slightly during this addition). Heating was continued for 3¼ hours at 52–63° C. After standing overnight at room temperature, the reaction mixture was diluted with 280 ml. of hexane and filtered to remove some insoluble material assumed to be polyacrylonitrile. The filtrate was washed with equal volumes of 1% by weight aqueous $H_2SO_4$, then with saturated salt water containing 2% by weight $Na_2CO_3$, then with saturated salt water, and finally with tap water. The washed solution was vacuum-stripped of solvent in a rotary evaporator, leaving 157 g. crude product which was a liquid containing 8.02% nitrogen (corresponding to 89% cyanoethoxystearonitrile and 11% unreacted hydroxystearonitrile). This product was purified to about 95% cyanoethoxystearonitrile by cooling it to 4° C. and filtering off the hydroxystearonitrile which crystallized out. Infrared analysis showed that the product was a mixture of 9- and 10-(β-cyanoethoxy)stearonitrile. These dinitriles have the formulae:

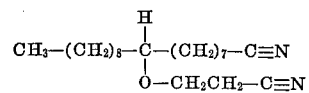

and

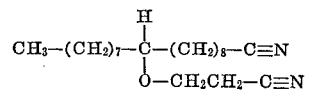

Such mixture of position isomers can be separated (as well as the isomers of the examples to follow) such as by chromatography. However, there is ordinarily no reason to do so since the compounds are functionally equivalent.

EXAMPLE II

Example I is essentially repeated using the mixture of 9 and 10 hydroxy substituted mononitriles obtained from palmitoleic acid. The resulting dinitriles have the formulae:

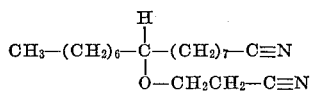

and

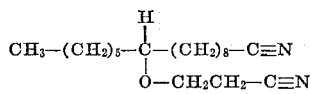

EXAMPLE III

Example I is essentially repeated using the mixture of 11 and 12 hydroxy substituted mononitriles obtained from vaccenic acid. The resulting dinitriles have the formulae:

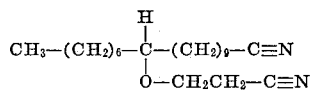

and

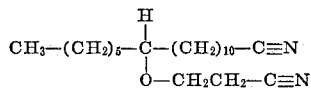

As indicated above, our new dinitriles are particularly useful for preparing diamines and then diisocyanates. The diisocyanates find use in the preparation of polymers by reaction with organic compounds containing active hydrogens.

The dinitriles are converted to the diamines by hydrogenation. The hydrogenation is carried out in the presence of ammonia utilizing a hydrogenation catalyst such as Raney cobalt or Raney nickel. The diamines are then converted to the diisocyanates by the conventional procedure of reacting phosgene therewith and then decomposing the intermediate carbamyl chlorides by raising the reaction temperature. An organic solvent such as toluene is preferably used.

The utility of our new dinitriles is accordingly illustrated by the following description.

EXAMPLE A

A solution of 155 g. of a mixture of 9- and 10-(β-cyanoethoxy)-stearonitrile as prepared in Example I in 150 g. of methanol and 10 ml. of liquid ammonia was hydrogenated over Raney active cobalt catalyst (approximately 23 g.) by heating at 145–148° C. in an autoclave under a hydrogen pressure of 1425–2160 p.s.i. until no more hydrogen was absorbed (approximately four hours). The reaction mixture was then cooled to room temperature, the excess hydrogen and ammonia vented, the catalyst filtered off, and the methanol removed by vacuum-stripping on a rotary evaporator. The crude product was vacuum-distilled to give a colorless liquid boiling at about 165–175° C. at 0.1 mm. Hg with an amine number of 315. Infrared analysis showed that the product was a mixture of 9- and 10-(γ-aminopropoxy) stearylamine. These diamines have the formulae:

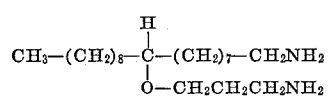

and

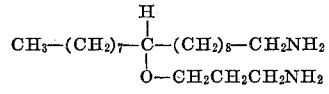

EXAMPLE B

Example A is essentially repeated using the mixture of dinitriles of Example II. The resulting diamines have the formulae:

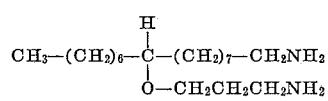

and

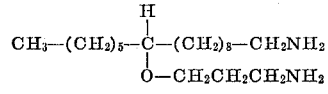

EXAMPLE C

Example A is essentially repeated using the mixture of dinitriles of Example III. The resulting diamines have the formulae:

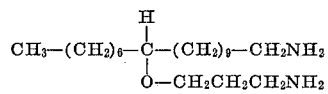

and

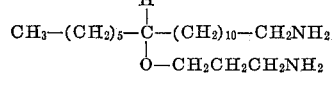

EXAMPLE D

To a stirred solution of 368 g. of phosgene in 800 ml. of dry toluene was added over a period of one hour a solution of 100 g. of diamine as prepared in Example A in 200 ml. of dry toluene (the reaction temperature, which was initially 15° C., rose to 36° C. during this time). Additional heat was then applied to bring the temperature to 64° C. over a period of three hours, while preventing escape of phosgene by means of a reflux condenser cooled to −5° C. The coolant in the reflux condenser was then changed to tap water to allow escape of excess phosgene and of hydrogen chloride while a slow stream of nitrogen was bubbled through the reaction mixture. The temperature of the reaction mixture was increased to 110° C. over a period of 1½ hr. About one-fourth of the toluene was then distilled off at atmospheric pressure and the remainder under vacuum in a rotary evaporator. The slightly cloudy residual product, amounting to 106 g., was clarified by filtering and then distilled through a falling-film molecular still to give a clear light yellow liquid with a refractive index of 1.459 ($n_D^{29}$) and an NCO content of 19.6%. Infrared analysis showed that the product was a mixture of 9- and 10-(γ-isocyanatopropoxy)stearyl isocyanate. These diisocyanates have the formulae:

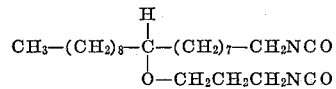

and

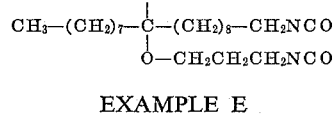

EXAMPLE E

Example D is essentially repeated using the mixture of diamines of Example B. The resulting diisocyanates have the formulae:

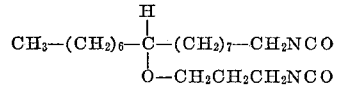

and

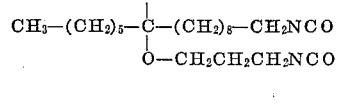

EXAMPLE F

Example D is essentially repeated using the mixture of diamines of Example C. The resulting diisocyanates have the formulae:

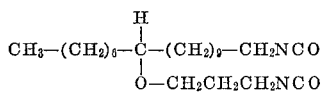

and

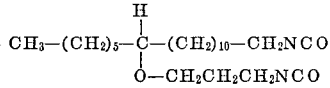

As indicated above the diisocyanates are particularly valuable for the preparation of polymers by reaction with compounds bearing at least two active hydrogen atoms as determined by the Zerewitinoff method. The Zerewitinoff test is described by Kohler in J. Am. Chem. Soc., 49, 3181 (1927). Such polymers are useful especially as coatings for a variety of substrates.

In general, the active hydrogen atoms of compounds reactive with the diisocyanates are attached to carbon, oxygen, nitrogen or sulfur atoms. Compounds containing the following groups will have active hydrogen atoms: primary amino, secondary amino, carboxyl, diazoamino, hydrazino, hydrazo, hydrazono, hydroxyamino, hydroxyl imido, imino, and mercapto. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, and —CSNH$_2$. Examples of suitable types of compounds include water, hydrogen sulfide, ammonia, hydroxyl polyesters, polyhydric, polyalkylene ethers, polyhydric polythioethers, polyacetals, aliphatic polyols, including alkane, alkene and alkyne diols, triols, tetrols and the like, aliphatic thiols including alkane, alkene and alkyne thios having two or more —SH groups; polyamines including both aromatic, aliphatic and heterocyclic diamines, triamines, tetramines and the like; as well as mixtures thereof. Of course, compounds which contain two or more different groups within the above-defined classes may also be used such as, for example, amino alcohols which contain an amino group and a hydroxyl group, amino alcohols which contain two amino groups and one hydroxyl group, aminoacids and the like. Further illustrative classes and specific organic compounds containing active hydrogen atoms useful for preparing polymers are described immediately hereinbelow.

Any suitable polyester may be used and may contain terminal hydroxyl groups, terminal carboxylic acid groups, amino groups or the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with polyhydric alcohols. It is also possible to use a mixture of polyhydric alcohols and polyamines such as ethylenediamine, polyethylenediamine, 1,4-butylenediamine and the like. Amines such as bis-(2-aminoethyl)ether or amino carboxylic acids such as glycine, alanine, valine, phenylalanine, hydroxyproline and the like may also be used. The polyesters may contain hetero atoms in addition to the ester groups including oxygen, sulfur, nitrogen and the like in the chain. Moreover, the radicals making up the polyester may be either saturated or unsaturated and may contain double or triple bonds as well as modifying radicals of saturated or unsaturated fatty acids such as oleic acid or fatty alcohols such as oleyl alcohol and the like.

Any suitable polycarboxylic acid may be used in the preparation of the polyesters such as, for example, oxalic acid, malonic acid, succinic acid, glutaric acid, adipic acid, pimelic acid, suberic acid, azelaic acid, sebacic acid, brassylic acid, maleic acid, fumaric acid, glutaconic acid, alpha-hydromuconic acid, beta-hydromuconic acid, alpha-butyl-alpha-ethyl-glutaric acid, alpha, beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, and the like. Any suitable polyhydric alcohol may be used in the preparation of the polyesters such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethylolpropane, 1,3,6-hexanetriol, triethanolamine, pentaerythritol, sorbitol and the like.

Any suitable polyhydric polyalkylene ether may be used as the active hydrogen containing compound such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylolpropane, pentaerythritol and the like in the preparation of the polyhydric polyalkylene ethers so that some branching exists in the product. Generally speaking, it is advantageous to condense from about 5 to about 30 moles of alkylene oxide per functional group of the trihydric or higher polyhydric alcohol. The polyhydric polyalkylene ethers may be prepared by any known process such as, for example, the process disclosed in 1859 by Wurtz and in Encyclopedia of Chemical Technology, Volume 7, pages 257 to 262, published by Interscience Publishers, Inc. (1951), or in U.S. Pat. 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pats. 2,862,972 and 2,900,368.

Any suitable polyhydric alcohol may be used as the active hydrogen containing compound such as, for example, alkane diols such as, for example, ethylene glycol, 1,3-propylene glycol, 1,2-propylene glycol, 1,4-butylene glycol, 1,3-butylene glycol, 1,5-pentanediol, 1,4-butanediol, 1,3-pentanediol, 1,6-hexanediol, 1,7-heptanediol, 2,2-dimethyl-1,3-propanediol, 1,8-octanediol and the like including 1,20-eicosanediol and the like; alkene diols such as, for example, 2-butene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 4-hexene-1,3,6-triol and the like; alkyne triols such as 2-hexyne-1,4,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diaminotoluene, 1,3,5-benzene triamine, 1,2,3-benzene triamine, 1,4,5,8-naphthalene tetramine and the like; aliphatic polyamines such as for example, ethylenediamine, 1,3-propylenediamine, 1,4-butylenediamine, 1,3-butylenediamine, diethylenetriamine, triethylenetetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole, piperazine and the like.

One especially preferred group of amines useful for preparing polymers are polyamines having the primary amine groups thereof blocked by ketimine or aldimine groups. The reaction of carbonyl compounds with the primary amine groups can be illustrated as follows:

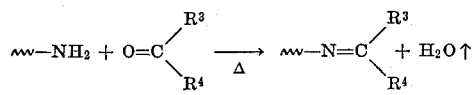

The useful carbonyl compounds may have the following theoretical structural formula

where $R^3$ and $R^4$ are organic radicals, are each substantially inert to the ketimine or aldimine formation reaction and are preferably hydrogen or short chain alkyl groups (1 to 4 carbon atoms). Preferred compounds are low molecular weight ($C_2$–$C_6$) aldehydes or ketones that are volatile so that an unreacted excess thereof may easily be removed by conventional distillation practices when the reaction is completed. Such volatile compounds are also preferred so that when the blocked polyamine is mixed with the diisocyanate and exposed to moisture, the freed aldehyde or ketone can be easily removed from the reaction mixture. Examples of preferred carbonyl compounds include such aldehydes and ketones as acetone, methyl ethyl ketone, methyl n-butyl ketone, methyl tert-butyl ketone, ethyl isopropyl ketone, acetaldehyde, propionaldehyde, butyraldehyde, isobutyraldehyde, and the like (i.e. including hexanone and hexanal). The polyamines to be blocked preferably have the structure

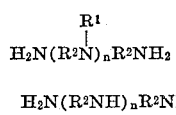

or $$H_2N(R^2NH)_nR^2NH_2$$

where $R^2$ is a difunctional aliphatic group containing from 2–48 carbon atoms, $R^1$ is an aliphatic group containing 1–24 carbon atoms and $n$ is an integer of from 0–20. Representative $R^1$ radicals are methyl, propyl, butyl, decyl, hexadecyl, hexenyl, octenyl, tridecenyl, octadecyl, undecynyl and the like. Inert or non-interfering groups such as Cl, nitro and the like may be present on $R^1$ and/or $R^2$.

Any suitable reaction product of a phenol with an alkylene oxide yielding a compound containing active hydrogens may be used such as, for example, those disclosed in U.S. Pat. 2,843,568, such as for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a novolac having the formula

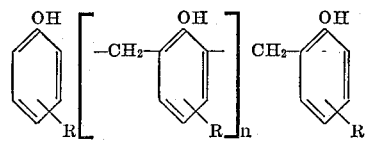

wherein $n$ is 1 to 5 and R is a lower alkyl radical such as methyl, ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of an alkylene oxide with a tolylenediamine such as, 2,4-tolylenediamine, 2,6-tolylenediamine or the like, a diphenylmethane diamine such as 4,4'-diaminodiphenylmethane or the like, xylylene diamine, as well as alkylene diamines such as, for example, ethylenediamine, propylenediamine, 1,4-butylenediamine, hexamethylenediamine and the like including 1,10-dodecane diamine.

Any suitable phenol may be used such as, for example, 2,2-bis(p-hydroxyphenyl)propane (Bisphenol A) and the like.

Any suitable polyamide may be used such as, for example, those obtained by reacting adipic acid with hexamethylenediamine and the like.

Any suitable polyacetal may be used such as, for example, the reaction product of formaldehyde or other suitable aldehydes with a polyhydric alcohol such as those disclosed above for use in the preparation of the hydroxyl polyester.

Other alcohol compounds which do not necessarily fit within any of the previously set forth classes of compounds and which nevertheless contain active hydrogen containing groups which are quite suitable for the production of the polymers are pentaerythritol, sorbitol, triethanolamine, mannitol, N,N,N',N'-tetrakis(2-hydroxypropyl)ethylenediamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as for example, carbomethoxy, carboethoxy and the like; dialkyl amino such as, for example, dimethylamino, diethylamino, dipropylamino, methylethylamino and the like; mercapto, carbonyl, thiocarbonyl, phosphoryl, phosphato and the like.

Other substances which can be used include natural substances such as castor oil and the like.

The molar proportions of the diisocyanate and the compounds bearing Zerewitinoff active hydrogen atoms can vary widely. Those skilled in the art can determine the proportions of reactants best suited for a particular purpose. For example, when making polyurethane elastomers, one often uses approximately equimolar amounts of glycol and the diisocyanate. Preferably, the active hydrogen containing compound will be used in a molar ratio to the diisocyanate of 1:10 to 10:1.

The polymers can be prepared by reacting the diisocyanate and the active hydrogen containing compound at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. Preferably, the reaction temperature ranges between about 20° C. and 150° C. However, the temperature is not critical.

If desired, the reaction may be carried out in an inert solvent. Representative solvents include tetrahydrofuran, o-dichlorobenzene, chlorobenzene, xylene, methyl isobutyl ketone, toluene and ethyl aceate. In general, the solvent should be free from isocyanate-reactable groups such as groups bearing Zerewitinoff-active hydrogen atoms.

In the preparation of the polymers, a portion of the diisocyanates (i.e. up to about 90 mole percent and preferably from 0 to 50 mole percent) can be replaced by known polyisocyanates. Representative of such known polyisocyanates are ethylenediisocyanate, hexamethylenediisocyanate, butylene-1,3-diisocyanate, ethylidene diisocyanate, butylidene diisocyanate, 1,2,4-butanetriisocyanate, 1,3,3 - pentanetriisocyanate, p - phenylene-2,2'-bis-(ethylisocyanate), 1,4 - naphthalene-2,2'-(bis(ethylisocyanate), 5-chloro phenylene-1,3-bis(propyl-3-isocyanate), tolylene diisocyanate, m-phenylene diisocyanate, p-phenylene diisocyanate, diphenylene-4,4'-diisocyanate, xylylene-1,4 - diisocyanate, 4,4' - diphenylenemethanediisocyanate and the like. A particularly desirable group of polyisocyanates to be employed in combination with the instant diisocyanates in the preparation of the polymers are those described in the application of Rogier and Kamal, Ser. No. 250,211, filed Jan. 9, 1963, entitled "Polyisocyanates and Derivatives." These polyisocyanates are derived from polymeric fat acids and have the following idealized structural formula:

$$[R5\text{+}(CH_2)yNCO]_x$$

where $y$ is 0 or 1, $x$ is an integer of 2 to about 4 and $R^5$ is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates.

EXAMPLE G

A coating composition was prepared by adding 7.4 g. of diisocyanate as prepared in Example D and 8.1 g. of a ketimine blocked polyamine to 6.6 g. mineral spirits. The ketimine blocked polyamine was prepared by reacting one mole of diethylenetriamine with two moles of methyl isobutyl ketone, the secondary amine group of the polyamine being blocked by reacting the above product with the diisocyanate of Example D in a molar ratio of 2 to 1 to give a compound of the formula:

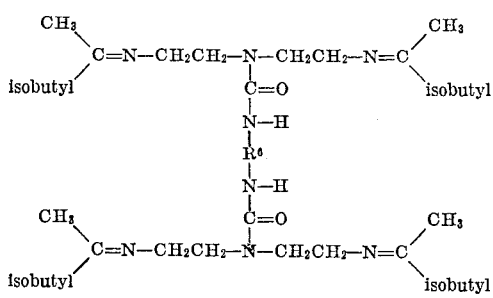

where $R^6$ is the residue of the diisocyanate exclusive of the isocyanato groups. Three mil thick coatings of the composition were cast on tin, glass and Carrara white glass. The coatings became tack free in 4–5 hours. After 14 days cure at 70° F. and 50% relative humidity, the coatings had these properties: Pencil Hardness on glass=<6B; Sward Rocker Hardness on glass=13.3; and G. E. Extensibility on tin=>60%. After 1000 hours exposure in a Xenon Arc Weather-Ometer, the coating on Carrara glass had a yellowness of 5.9 (initial 5.0) and 60° gloss reading of 30 (initial 94).

EXAMPLE H

Example G was repeated except that the ketimine blocked polyamine was replaced by 9.5 grams of a compound prepared in the same manner except that dimeryl isocyanate was used in the preparation thereof. The dimeryl isocyanate had the structural formula $D(CH_2NCO)_2$ where D is the dimeric fat acid radical derived from the mixture of dimerized fat acids obtained from the fat acids in tall oil consisting mainly of a mixture of dimerized linoleic and oleic acids. The compound had the formula

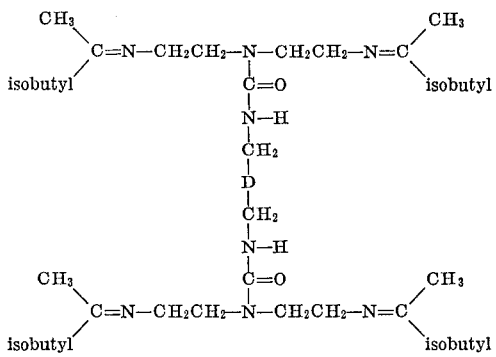

The resulting coatings had the following properties: Pencil Hardness on glass=<6B; Sward Rocker Hardness on glass=13.3; G.E. Extensibility on tin=>60%; yellowness on Carrara glass=6.0 (initial 14.2); and 60° gloss reading on Carrara glass=42 (initial 93).

It is to be understood that changes and variations may be made without departing from the spirit and scope of the invention as defined in the appended claims.

The embodiments of the invention in which an exclusive property or privilege is claimed are defined as follows:

1. A dinitrile having formula:

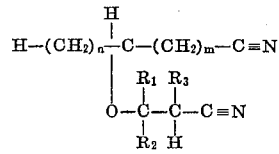

where $n$ is 5 to 20, $m$ is 0 to 15, the sum of $n$ and $m$ is 14 to 20 and $R_1$, $R_2$ and $R_3$ are hydrogen or alkyl groups of 1 to 4 carbon atoms.

2. The dinitrile of claim 1 wherein $R_1$, $R_2$ and $R_3$ are hydrogen.

3. The dinitrile of claim 1 wherein the sum of $n$ and $m$ is 16.

4. The dinitrile of claim 1 wherein the sum of $n$ and $m$ is 16 and $R_1$, $R_2$ and $R_3$ are H.

5. The dinitrile of claim 1 wherein $n$ is 9 and $m$ is 7.

6. The dinitrile of claim 1 wherein $n$ is 8 and $m$ is 8.

7. The dinitrile of claim 1 wherein $n$ is 7 and $m$ is 7.

8. The dinitrile of claim 1 wherein $n$ is 6 and $m$ is 10.

9. The dinitrile of claim 5 wherein $R_1$, $R_2$ and $R_3$ are hydrogen.

References Cited

UNITED STATES PATENTS

| | | | |
|---|---|---|---|
| 2,437,905 | 3/1948 | Bruson | 260—465.6 |
| 2,712,558 | 7/1955 | Vander Wal | 260—465.6 X |
| 3,151,150 | 9/1964 | Kamlet | 260—465.6 X |

JOSEPH P. BRUST, Primary Examiner

U.S. Cl. X.R.

260—18 N, 47 EP, 47 CD, 55 R, 72 B, 75 TN, 77.5 AT, 78 R, 78 A, 453 AL, 544 C, 553, 584 R